United States Patent
Grossklaus, Jr. et al.

(10) Patent No.: US 6,233,822 B1
(45) Date of Patent: *May 22, 2001

(54) REPAIR OF HIGH PRESSURE TURBINE SHROUDS

(75) Inventors: Warren D. Grossklaus, Jr., West Chester; Patricia A. Charles, Hamilton, both of OH (US)

(73) Assignee: General Electric Company, Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/217,591

(22) Filed: Dec. 22, 1998

(51) Int. Cl.$^7$ ........................................... B23P 15/00
(52) U.S. Cl. ..................... 29/889.1; 29/889.7; 29/402.1; 29/402.8
(58) Field of Search .................. 29/889.1, 889.7, 29/402.1, 402.8

(56) References Cited

U.S. PATENT DOCUMENTS

| | | | |
|---|---|---|---|
| 2,861,900 | 11/1958 | Smith et al. | 117/105 |
| 3,544,648 | 12/1970 | Boone et al. | 117/2 |
| 4,095,003 | 6/1978 | Weatherly et al. | 427/34 |
| 4,155,152 | * 5/1979 | Cretella et al. | 29/889.1 |
| 4,176,433 | 12/1979 | Lee et al. | 29/156 |
| 4,285,108 | * 8/1981 | Arrigoni | 29/889.1 |
| 4,291,448 | * 9/1981 | Cretella | 29/889.1 |
| 4,416,421 | 11/1983 | Browning | 239/79 |
| 4,478,638 | 10/1984 | Smith, Jr. et al. | 75/255 |
| 4,842,953 | 6/1989 | Perkins et al. | 428/553 |
| 4,861,618 | 8/1989 | Vine et al. | 427/34 |
| 4,865,252 | 9/1989 | Rotolico et al. | 239/8 |
| 4,897,315 | 1/1990 | Gupta | 428/552 |
| 5,019,686 | 5/1991 | Marantz | 219/76.14 |
| 5,059,095 | 10/1991 | Kushner et al. | 416/241 B |
| 5,120,582 | 6/1992 | Browning | 427/423 |
| 5,523,170 | 6/1996 | Budinger et al. | 428/551 |
| 5,561,827 | 10/1996 | Reeves et al. | 419/5 |
| 5,628,814 | 5/1997 | Reeves et al. | 75/255 |
| 5,644,828 | 7/1997 | Sailer et al. | 29/402 |
| 5,705,281 | 1/1998 | Reeves et al. | 428/553 |
| 5,956,845 | * 9/1999 | Arnold | 29/889.1 |

OTHER PUBLICATIONS

Japanese Abstract, Publication No. 63069957, appln 61212219, Ootsuru Makoto inventor–Repairing Method for Cylinder Rod.

Co–pending 08/514,923, filed Aug. 15, 1995 and 08.473,390 filed Jun. 7, 1995 divisionals of 07/875,184 filed Apr. 27, 1992 –all now abandoned. BK Gupta, et al, Process for Coating an Article Protected by a Thermal Barrier Coating System.

*HVOF Combustion Spraying of Inconel Powder*, Proceedings of the Intern'l Thermal Spray Conference & Exposition, Orlando, FL May 28–Jun. 5, 1992; pp. 181–187.

*A Pragmatic Analysis and Comparison of the HVOF Process*, Proceedings of the Int'l Thermal Spray Conference & Exposition, Orland, FL, May 5–Jun. 5, 1992; pp. 137–147.

* cited by examiner

Primary Examiner—I Cuda
(74) Attorney, Agent, or Firm—Andrew C. Hess; Gerry S. Gressel

(57) ABSTRACT

A method for repairing the shroud surfaces of a gas turbine engine to provide corrosion and oxidation resistance of the shroud segments while also restoring the dimensional integrity of the shroud segments. The method entails removing the oxidation and corrosion products from the shroud segment, removing preexisting coating materials, applying a material compatible with the shroud segment substrate material, machining the surface, applying a corrosion-resistant, oxidation-resistant and rub-compliant material to the shroud segment using a HVOF process, machining the shroud segment to preselected dimensions and applying an aluminide coating for improved oxidation and corrosion resistance of the repaired surfaces.

19 Claims, 2 Drawing Sheets

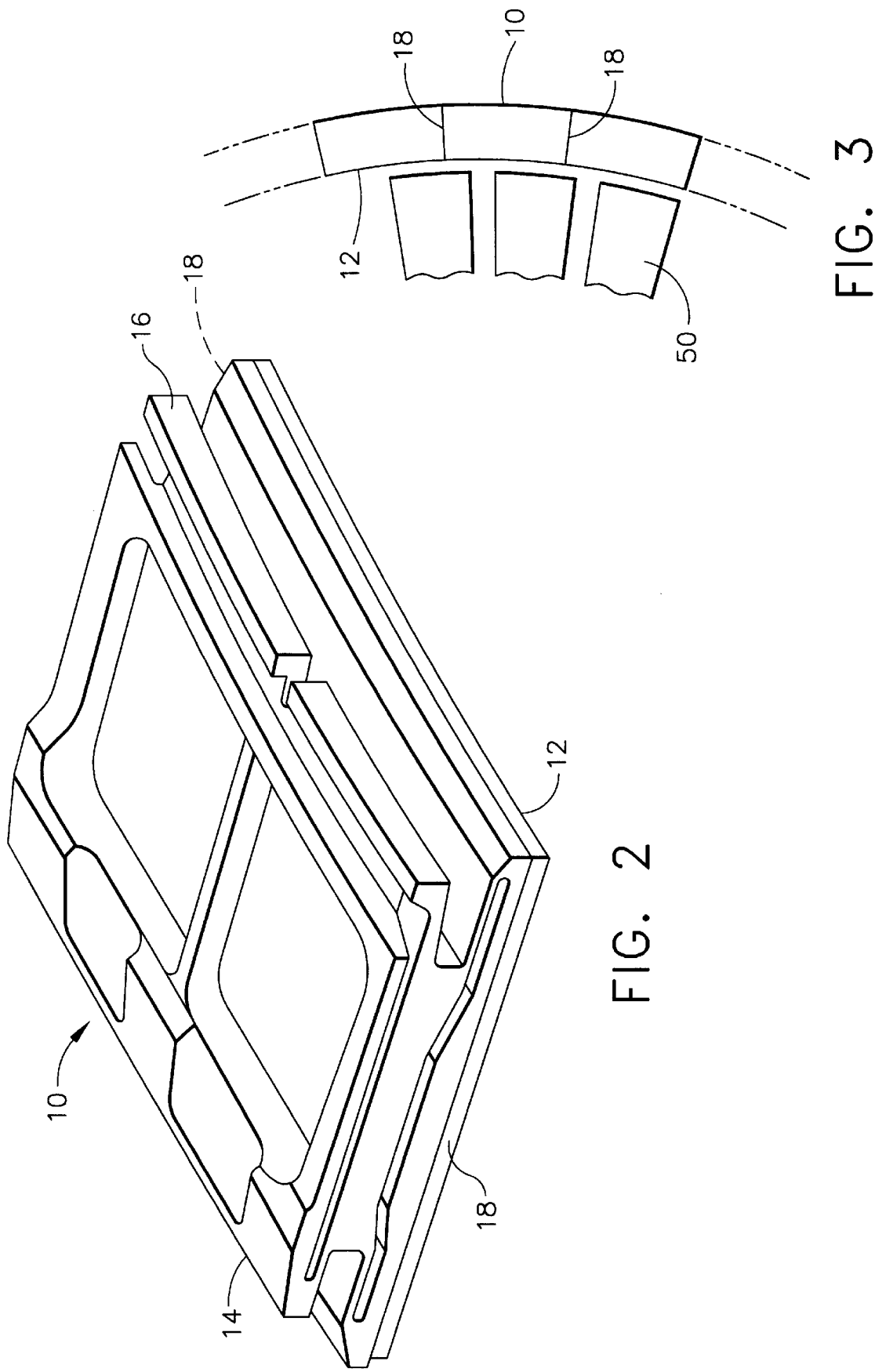

REPAIR OF HIGH PRESSURE TURBINE SHROUDS

BACKGROUND OF THE INVENTION

1. Field of the Invention

This invention relates to repair of high pressure turbine shrouds. More particularly, it relates to the method of repairing high pressure turbine shrouds utilizing a high velocity oxyfuel (HVOF) and materials used for such repairs.

2. Discussion of Prior Art

In gas turbine engines, a shroud typically surrounds the tips of the rotor blades in the turbine section of the engine. Pressurized air and fuel are burned in a combustion chamber to add thermal energy to the medium gases flowing therethrough. The effluent from the chamber comprises high temperature gases, which are flowed downstream in an annular flow path through the turbine section of the engine. Nozzle guide veins at the inlet to the turbine directed the medium gases onto a multiplicity of blades which extend radially outward from the engine rotor. An annular shroud that is supported by the turbine case surrounds the tips of the turbine blades to contain the medium gases flowing thereacross to the flow path. The clearance between the blade tips and the shroud is minimized to prevent the leakage of medium gases around the tips of the blades. Shrouds provide a rubbing surface for the tip of the blade. The design intent is for the blade tip to rub into the shrouds, thus reducing the amount of air that can bypass the turbine airfoils. Minimizing the air that can bypass the turbine airfoils increases the efficiency of the engine. A secondary function of the shroud is to thermally shield the case from the hot flow path gas.

The shroud thus is exposed to abrasion from the rotating turbine blade tips. Simultaneously, the shroud also is exposed to the hot flow path gases that are burned in a combustion chamber. These gases over a period of time not only result in corrosion and high temperature oxidation of the shroud, but also function to cause erosion of the shroud surfaces. Thus, the shroud must be designed to be at once resistant to corrosive and oxidation effects of the hot gases, erosion resistant to the constant flow of the hot gases over the shroud surfaces and abrasion resistant, or rub compliant, as a result of the contact with the turbine blade seal teeth.

Over a period of time, as the engine it utilized, the surfaces of the shrouds tend to be worn from the rubbing surfaces of the blades' tips. In addition, some erosion takes place as the hot gases mechanically erode the shroud flow path surfaces. Additionally, some corrosion and oxidation of the shroud surfaces also occurs due to the corrosive action of the gases on the shroud surfaces.

Because of the high cost of the shroud materials, rather than dispose of the shrouds that are made from expensive superalloy material and machined to exacting and tight tolerances, it is desirable to repair the shrouds by restoring the shrouds to their original dimensions in accordance with preselected tolerances as determined by the engine's size as well as to restore the corrosion resistant properties to the flow path surfaces. In the past, this restoration has been accomplished by low pressure plasma spray (LPPS) or by use of thermally densified coatings (TDC). While both of these methods provide repairs and restorations that are effective, both suffer from some limitations. For example, the VPS and LPPS processes spray MCrAlY in a vacuum chamber on a heated substrate, making the process very sensitive to leaks, as the partial vacuum must be maintained in order to successfully accomplish the repair. Only a limited number of parts can be processed at any one time with the LPPS process. Additionally, LPPS requires a preheat, and coupled with the welding process, can result in considerable part distortion. While this method has the advantage of being able to provide a repaired shroud that can be used at higher temperatures than other methods, the deposition of the material also is accomplished at a much slower rate. The result is than the shroud is either restored to minimum or below minimum dimensions, or significant cost is incurred in adding additional material to the shroud during repair. The result is that this method is slow, time consuming and considerably expensive. The TDC process utilizes brazed preforms, which may be in the form of powders, to build up the sides and the flow paths on all the surfaces. The preforms typically include epoxy as a bonding agent. The result is that the parts typically include some undesirable, and sometimes unacceptable porosity. Of course, the quality of parts repaired by the TDC process is dependent on the quality of the preforms. The materials that are utilized in a TDC process typically contain melting point depressants such as silicon and boron or combinations of these elements. Because these materials are designed to melt at temperatures of about 2300° F. or less, they must be applied at temperatures below the incipient melting temperature of the base material. Shrouds that are repaired using these materials cannot be utilized in applications above about 2250° F.

What is desired is a method of repairing high pressure turbine shrouds after engine running to extend the life of the shrouds and provide cost effective operation of the engine while applying oxidation-resistant, corrosion-resistant and rub-compliant materials that can withstand temperatures higher than about 2250° F.

BRIEF SUMMARY OF THE INVENTION

The present invention is a method for repairing turbine shrouds removed from turbine service. The repair restores the corrosion and oxidation resistance characteristics to the shroud while at the same time restoring the dimensional characteristics to the shroud flow path surfaces, the shroud forward and aft rails and the left and right sides of the shroud. The method comprises a series of steps. Because of the extremely high temperatures, in excess of 2300° F., from the hot gases of combustion that a shroud is exposed to, loose surface contaminants, including products of combustion and oxidation by-products, form on the exposed surfaces of the shroud at these temperatures. After the turbine shroud is removed from service, these loose surface contaminants must first be removed. This cleaning exposes any coating materials that may have been applied to the shroud prior to placing it in service. The next step involves removing the remaining coating materials applied to the shroud prior to being placed in service that still remain on the shroud. These coatings may have been applied to provide corrosion resistance characteristics, oxidation resistance characteristics, abradability characteristics, or all of these characteristics, to the shroud. After removal of the coatings, activated diffusion healed (ADH) or partitioned alloy component healing (PACH) material is applied to the exposed surfaces of the shroud to fill any existing voids, such as cracks or holes, that may have occurred over the operational life of the shroud or than may have been formed in the shroud during its original manufacture. After the voids have been filled, the applied compliant material is machined to provide a smooth surface for the remainder of the restoration steps. Next, the ends of the shrouds are repaired by weld depositing a superalloy material compatible with the base material of the shroud, if needed. This build-up restores the shroud base material that had been worn away during operation of the engine. Next, a corrosion and oxidation resistant, rub-compliant material is sprayed onto the flow path surfaces of the shroud as well as to the side surfaces (forward and aft rails) of the shroud using a high velocity oxyfuel process (HVOF). In this process, the filler material originates as a powder that is sprayed onto the substrate in the HVOF process. While this filer material may be any corrosion resistant, oxidation resistant and rub tolerant powder, MCrAlY and superalloys, typically Ni-base superalloys have been found to be suitable. Sufficient material is sprayed onto the repaired substrate to at least restore the substrate to the minimum dimensions required for a new shroud. The shroud is then machined to preselected dimensions, which are dimensions within the tolerances set forth for a new shroud. Finally, an aluminide is optionally applied to the shroud for improved oxidation resistance.

The present invention is an advancement of current technology for repairing and restoring shrouds for engine service. Unlike shrouds repaired by the TDC process, shrouds repaired in accordance with the present invention are not temperature-limited because of additions of melting point depressants such as boron or silicon. The present invention is also an advance over low pressure plasma spraying (LPPS) since no partial vacuum is required, making the process faster, cheaper, more effective and easier to perform. Other advantages include less process variation and no preheat to overshoot or undershoot. Very importantly, there is much less part distortion, so that the ability to restore the shroud segments to the original drawing tolerances can be done more easily and with less machining. Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 2 is a perspective view of a shroud segment; and

FIG. 3 is a partial perspective view of a shroud assembly, comprised of a series of shroud segments assembled to form a portion of a cylinder around turbine blades.

DETAILED DESCRIPTION OF THE INVENTION

Figure 1:
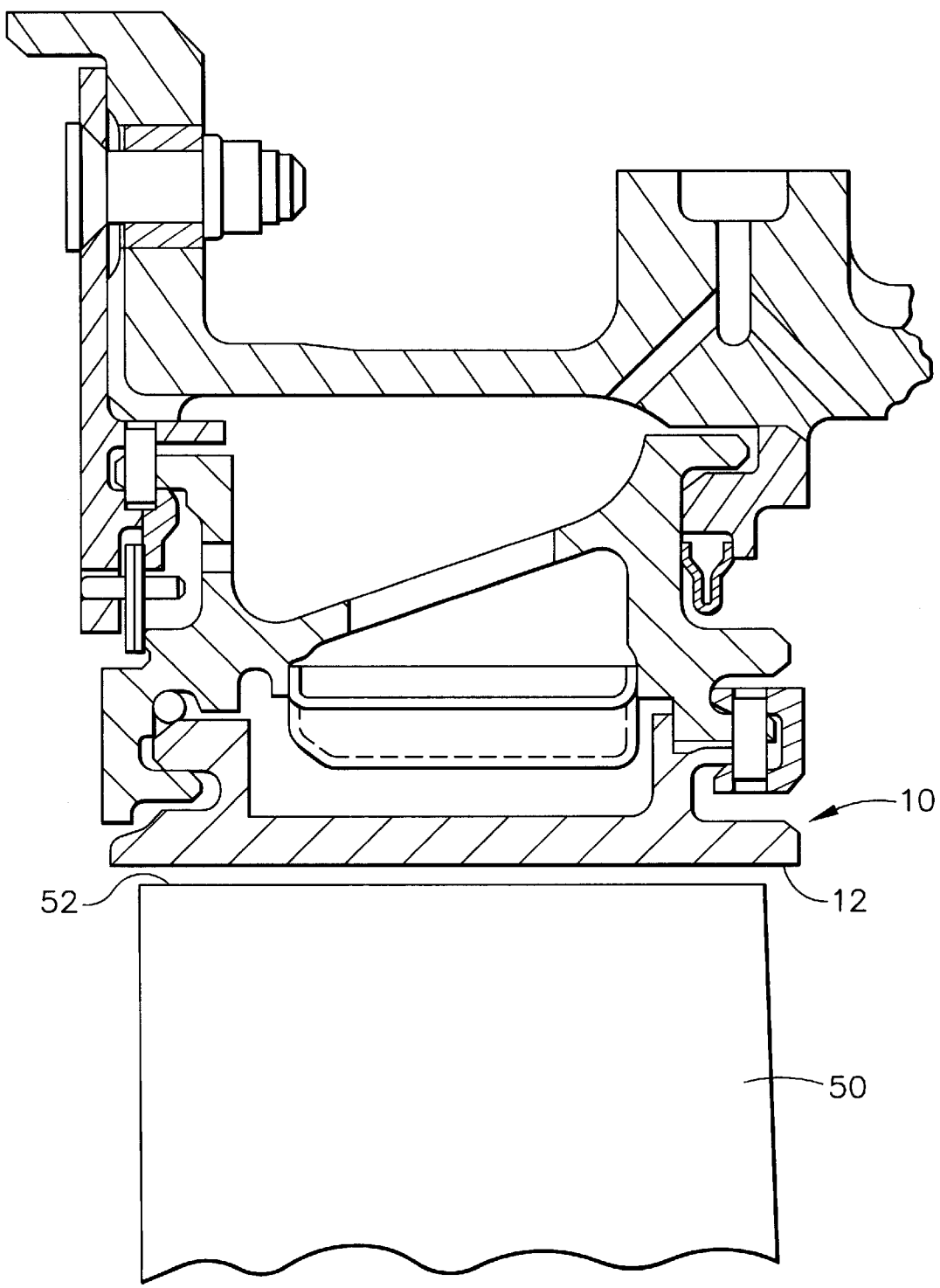
FIG. 1 is a cross-sectional view of a shroud assembly, showing a shroud segment showing the shroud flow path surface adjacent to the tip of a turbine blade, the shroud support, the shroud hanger support and the support case.

FIG. 1 is a cross-sectional of a turbine engine shroud assembly, showing shroud segment 10. In this view, the shroud segment 10 has a flow path surface 12. Also shown for illustration purposes is a turbine blade 50 having a tip 52 immediately adjacent to the flow path surface 12 of the shroud segment. FIG. 2 is a perspective view of shroud segment 10 of FIG. 1. The shroud segment has a fore end 14 and an aft end 16. As shown in FIG. 3, a number of shroud segments having sides 18 are assembled together to form a shroud assembly that has the shape of a cylinder surrounding the turbine blades. As the hot gases of combustion move rapidly from the combustors along the interior of the engine and across the shroud flow path surfaces 12 from the fore end 14 of the shroud segments to the aft end 16 of the shroud segments, the turbine blades are rotated. As can be seen, the tighter the tolerance between the shroud segments and the blades, the more efficient the engine will operate, since smaller volumes of gases will escape across the shroud flow path.

With reference to FIG. 1, turbine blades 50 are designed with tips 52 to cut into the flow path surface 12 of the shroud segments, which generally are comprised of a rub-compliant material. Of course, during the course of engine life, the clearance between the blade 52 and flow path surface 12 will gradually increase just from the operation of the rotating blades against the fixed shroud assemblies at various operating temperatures. Furthermore, as the hot gases of combustion pass along the engine interior across the shroud assembly from the fore rails to the aft rails, mechanical erosion of material from the shroud assemblies will also occur, thus increasing the clearance between the blades and the shroud assembly. Also, the hot gases of combustion contain a number of undesirable by-products which will cause not only oxidation, but also corrosion of the shroud assembly materials. Because the shroud assembly is comprised of a number of shroud segments assembled together to form a ring, as the shroud flow path material is removed, by whatever process described above, a gap develops along the shroud sides 18 between the shroud segments. Eventually, as engine efficiency continues to decrease, the engine must be refurbished to restore the engine parts, including the shroud segments to their original conditions, both dimensionally and materially.

The method for repairing turbine shroud assemblies removed from turbine service to restore corrosion resistance to and restore the dimensions of the shroud segments 10 to within the dimensional tolerances specified for new shroud segments, requires that worn segments 10 first must be cleaned of loose surface contaminants as well as any products of corrosion or oxidation. Any well known degreasing cleaning method may be used. The segments are then ground or grit-blasted to remove any tightly adhering oxides. Next the segments are acid stripped to remove the aluminides, followed by a fluoride-ion cleaning (FIC). Because this acid stripping removes material in the form of aluminides from the segments, the segments are now below print dimension. At his point, this is not an undesirable condition, because the subsequent addition of material and machining of the shroud segment faces will also allow for correction of chording. Chording is a tendency of shroud segments to bow during elevated temperature service.

The surfaces of the shroud segments are then restored using an activated diffusion healing (ADH) process to remove voids such as holes originally machined into the shroud segments or cracks that may have developed during service. The ADH process is described in U.S. Pat. Nos. 5,523,170 issued Jun. 4, 1996 and 5,561,827 issued Oct. 1, 1996 incorporated herein by reference. Typically, the material used in the ADH process will be matched to the base material comprising the shroud segment, and typically is identical to the substrate base materials, allowing for the elements added to accomplish ADH. However, it can be any other alloy compatible with the base material of the shroud segment. After repair of the surfaces by the well-known ADH process, the repaired surfaces are machined to provide a smooth substrate for subsequent operations and at least one shroud surface must be machined to establish a starting point for subsequent machining, usually the predetermined datum surface of a new shroud segment.

At this point, the repair of the shroud segments may be accomplished by either of two alternative sequences depending upon the condition of the base material of the shroud segment substrate. The first alternative is typically used when the substrate material does not have a tendency to corrode badly in service, such as MAR-M-509, having a nominal composition by weight of 10% Ni, 0.6% C, 0.1%

Mn, 0.4% Si, 22.5% Cr, 1.5% Fe, 0.01% B, 0.5% Zr, 7% W, 3.5% Ta and the balance Co and incidental impurities, L605 having a nominal composition by weight of 20% Cr, 10% Ni, 15% W, 3% Fe, 1%, Si, 1.5% Mn, 0.1% C, and the balance Ni and incidental impurities; Rene N5, having a nominal composition by weight of 7.5% Co, 7% Cr, 6.2% Al, 6.5% Ta, 5% W, 3% Re, 1.5% Mo, 0.15% Hf, 0.05% C, 0.004% B and the balance Ni and incidental impurities; or IN-738 having a nominal composition by weight of 8.5% Co, 16% Cr, 3.4% Al, 3.8% Ti, 1.75% Ta, 2.6% W, 1.75% Ta, 0.012% B 0.0.12% Zr, 0.05% Cb and the balance Ni and incidental impurities. A material, typically in the form of a powder and having enhanced environmental resistance which is rub compliant, such as an MCrAlY(X) where M is an element selected from the group consisting of Co and Ni and combinations thereof and (X) is an element selected from the group of solid solution strengtheners and gamma prime formers consisting of Ti, Ta, Re, Mo and W and grain boundary strengtheners consisting of B, C, Hf and Zr and combinations thereof or BC-52 having a nominal composition, in weight percent, of 18% Cr, 6.5% Al, 10% Co, 6% Ta, 2% Re, 0.5% Re, 0.5% Hf, 0.3%Y, 1% Si, 0.015% Zr, 0.015% B, 0.06% C, the balance Ni and incidental impurities, is applied by the HVOF process. First, a plurality of shroud segments is assembled into a ring fixture. A robot holding the HVOF equipment is rotated through an arc, typically of at least about 120°, so that the shroud flow path surface 12 and the fore and aft rails 14, 16 of the shroud segment are built up with material. The material is applied by the HVOF process to a thickness of 0.005–0.150 inches, but preferably to a thickness of from 0.005–0.010 inches. The HVOF process, which utilizes a high velocity gas as a protective shield to prevent oxide formation, is a relatively low temperature thermal spray that allow for application of a high density oxide-free coating in a wide variety of thicknesses. The HVOF process typically uses any one of a variety of fuel gases, such as oxygen, oxypropylene, oxygen/hydrogen mixtures or kerosene. Gas flow of the fuel can be varied from 2000–5000 ft/sec. Of course, the temperature of the spray will depend on the combustion temperature of the fuel gas used, but will typically be in the range of 3000–5000° F. After the desired amount of material has been applied, typically taking the shroud segments above drawing tolerances, the shroud segments are then machined to the preselected drawing dimensions, machining being accomplished by setting up the machining operations based on the previously machined datum surface. Machining will typically include restoration of holes previously filled by the ADH process, as required by the applicable service requirements. After machining, in order to achieve improved oxidation resistance, an aluminide is applied to the shroud segment sides 18. This aluminide, which may be a PtAl or a NiAl, may be applied by any technique.

In the second alternative sequence, when the base material of the shroud segment is comprised of an alloy that tends of corrode in service, for example, Rene N5, the sides 18 of the shroud are restored by welding using a standard tungsten inert gas (TIG) method or a plasma tungsten arc (PTA) repair. The filler metal is a superalloy such as Rene N5, L605, HS188 having a nominal composition by weight of 0.1% C, 1.25% Mn, 0.4% Si, 22% Cr, 3.5% Fe, 22% Ni, 15.5% W and the balance Co and incidental impurities, or Rene 142, having a nominal composition by weight of 12% Co, 6.8% Cr, 6.15% Al, 6.35% Ta, 4.9% W, 2.8% Re, 1.5% Mo, 1.5% Hf, 0.12% C, 0.2% Fe, 0.01% Mn, 0.015% B and the balance Ni and incidental impurities. Because the sides are corroded, the cleaning procedures reduce the dimensions below minimum, and this repair restores the end dimensions to drawing tolerances or slightly above. Although the HVOF process could be used to restore these dimensions to provide a part that meets the original drawing requirements, the existing set-up would require a substantial overspray of the surfaces and subsequent time-consuming machining of the oversprayed surface. Alternatively, the shroud segments could be refixtured and HVOF repaired; however, this also is time consuming and not as efficient as repair by TIG or PTA.

Following this repair, the shroud segments have corrosion-resistant material, preferably an MCrAlY as described above, applied using the HVOF process to a thickness preferably of 0.005–0.010 inches, although the material can be applied in thicknesses up to about 0.150 inches or greater and the shroud segments are machined as set forth above. After machining, an additional coating of corrosion-resistant, oxidation-resistant material is applied by the vapor deposition method to protect bare machined surfaces. This additional corrosion-resistant, oxidation-resistant material is applied by the vapor deposition method to allow the material in the form of vapors to penetrate any internal cavities of the substrate material. This is preferred since the substrate of the shroud segment in this alternative sequence is known not behave as well as other substrates in terms of corrosion and oxidation resistance. Furthermore, since the process of cleaning, such as acid stripping and FIC, results in the penetration of cooling holes and removes the original corrosion/oxidation resistant coatings, it is necessary to reapply protection to such substrates using a method such as vapor deposition that allows for penetration of such internal cavities and cooling holes. Although many different corrosion resistant materials that can be applied using vapor deposition methods, the preferred deposited coating are NiAl materials.

EXAMPLE 1

A shroud from an engine was removed and repaired by the method set forth above. The shroud was made from MAR-M-509 and received an aluminide coating after repair by HVOF applications of CoNiCrAlY to a thickness of 0.005–0.015 inches and subsequent machining. In lab tests, the shroud experience a 2 mil (0.002 inches) incursion rate at a shroud temperature of 1800° F. with Rene 80 blades. Similar shrouds were repaired by the VPS and TDC repair methods and subjected to the same test conditions. After testing the shrouds were examined and there was no significant differences in the rub characteristics of the coatings applied by the different methods. The HVOF rub depth varied from about 5×E-06 to 2.5×E-05 inches for the HVOF-repaired shroud, while the TDC-repaired shroud varied from 0 to about 2.5×E-05 inches. Only one measurement was available for the VPS-repaired shroud, which was 5×E-06 inches. For thicknesses of applied coating of 0.005–0.010 inches, these differences are insignificant.

EXAMPLE 2

A shroud was removed from an engine. The shroud segments were repaired by HVOF and VPS techniques. The shroud substrate material was Inconel IN-738. The shroud was reassembled into the engine and tested with the blade tip clearances set low to initiate hard rubs. The maximum flow path temperatures were 2150° F. There was no visual difference in the rub characteristics of the coatings applied by the different processes following testing.

The present approach provides a suitable method for repairing shrouds removed from service at substantial time and cost improvements and with lower part distortion than parts repaired by competing repair techniques. It provides higher temperature capabilities than parts repaired by the TDC method. It also provides for less process variation than parts repaired by the VPS method. The method has been described in connection with specific embodiments and examples. However, those skilled in the art will recognize various modifications and variations of which the present invention is capable without departing from its scope as represented by the appended claims.

What is claimed is:

1. A method for repairing turbine shrouds having a plurality of segments removed from service by restoring corrosion resistance, oxidation resistance and dimensional characteristics to the shroud segments, each shroud segment having a flow path surface, a forward rail, an aft rail, a left side and a right side, comprising the steps of:

cleaning the turbine shroud segment removed from service to remove loose surface contamninants;

removing preapplied coating materials from the shroud segment surfaces to be repaired;

applying a first material compatible with the shroud segment substrate material to fill existing voids on surfaces to be repaired;

machining the repaired surface to achieve a smooth surface;

then, HVOF spraying a powder of a corrosion-resistant, oxidation-resistant and rub-tolerant material to the side surfaces of the shroud segments and the flow path surface to restore the original dimensions of the flow path surface of the shroud segment using a high velocity oxyfuel process;

then, machining each shroud segment to preselected dimensions; and applying an aluminide for improved corrosion and oxidation resistance over the surfaces of the fore and aft rails and the surfaces of the shroud flow path surfaces.

2. The method of claim 1 wherein the corrosion-resistant, oxidation-resistant powder is BC52.

3. The method of claim 1 wherein the corrosion-resistant, oxidation resistant powder is a MCrAlY(X), in which M is an element selected from the group consisting of Ni, Co and combinations thereof and X is optionally an element selected from the group consisting of Ti, Ta, Re, Mo, W, B, C, Hf, Zr, and combinations thereof.

4. The method of claim 1 wherein the corrosion resistant material is sprayed to a thickness of from 0.005–0.150 inches.

5. The method of claim 4 wherein the corrosion resistant material is sprayed to a thickness of from 0.005–0.010 inches.

6. The method of claim 1 further including the step of assembling a plurality of shroud segments into a ring fixture immediately prior to spraying.

7. The method of claim 1 wherein the step of building up the sides of the shroud segments includes weld depositing a superalloy material selected from the group of materials consisting of HS-188, L-605, Rene N5 and Rene 142 by a process selected from the group consisting of TIG and PTA.

8. The method of claim 1 wherein the step of applying the first material includes applying an alloy compatible with the shroud segment substrate material and having a melting point less than the melting point of the shroud segment substrate material.

9. The method of claim 1 wherein the step of HVOF spraying is performed using an oxyfuel selected from the group consisting of oxygen, oxypropylene, oxygen/hydrogen mixtures and kerosene.

10. A method for repairing a turbine shroud having a plurality of segments removed from service by restoring corrosion resistance, oxidation resistance and dimensional characteristics to the shroud segment the shroud segment, having a flow path surface, a forward rail, an aft rail, a left side and a right side, comprising the steps of:

cleaning the turbine shroud segment to remove loose foreign material;

removing preapplied coating materials from the shroud segment surfaces to be repaired;

applying a first material compatible with the shroud segment substrate material to fill existing voids on surfaces to be repaired;

machining the repaired surface to achieve a smooth surface;

building up the sides of the shroud segment to restore material worn away by service by weld depositing a superalloy material compatible with the substrate material of the shroud segment;

then, spraying a powder of corrosion resistant, oxidation resistant and rub-compliant material to the surfaces of the fore and aft rails and the flow path surface of the shroud segment to restore original dimensions of the shroud segment using a high velocity oxyfuel process;

then, machining each shroud segment to preselected dimensions; and applying a coating of corrosion and oxidation resistant material by a process selected from the group consisting of the vapor phase deposition process and the pack cementation process.

11. The method of claim 10 wherein the substrate material of the turbine shroud segment is a superalloy and the first material is a superalloy.

12. The method of claim 11 wherein the superalloy is a nickel base superalloy.

13. The method of claim 12 wherein the nickel base superalloy is Rene N5 and the first material is compatible with Rene N5.

14. The method of claim 12 wherein the nickel base superalloy is IN-738 and the first material is compatible with IN-738.

15. The method of claim 11 wherein the base material of the turbine shroud is a cobalt base superalloy.

16. The method of claim 10 wherein the corrosion-resistant, oxidation-resistant coating applied by vapor phase deposition is a nickel aluminide.

17. The method of claim 10 wherein the corrosion-resistant, oxidation resistant sprayed powder is a MCrAlY (X), in which M is an element selected from the group consisting of Ni, Co and combinations thereof and X is optionally an element selected from the group consisting of Ti, Ta, Re, Mo, W, B, C, Hf, Zr, and combinations thereof.

18. The method of claim 10 wherein the second corrosion resistant material is sprayed to a thickness of from 0.005–0.010 inches.

19. The method of claim 10 further including the step of assembling a plurality of shroud segments in a ring fixture immediately prior to spraying.

* * * * *